United States Patent [19]

Injeyan et al.

[11] Patent Number: 4,598,409
[45] Date of Patent: Jul. 1, 1986

[54] CW HF R-BRANCH LASER

[75] Inventors: Hagop Injeyan, Los Angeles; John H. S. Wang, Rancho Palos Verdes, both of Calif.

[73] Assignee: The United States of America as represented by the Secretary of the Air Force, Washington, D.C.

[21] Appl. No.: 583,026

[22] Filed: Feb. 23, 1984

[51] Int. Cl.$^4$ .............................................. H01S 3/095
[52] U.S. Cl. .................................... 372/89; 372/701; 372/55
[58] Field of Search ....................... 372/99, 89, 19, 20, 372/90, 32, 55, 701

[56] References Cited

U.S. PATENT DOCUMENTS

| | | | |
|---|---|---|---|
| 3,688,215 | 8/1972 | Spencer et al. | 372/89 |
| 3,818,374 | 6/1974 | Emanuel | 372/89 |
| 3,832,650 | 8/1974 | Roberts | 372/89 |
| 3,959,741 | 5/1976 | Meinzer | 372/89 |
| 4,095,193 | 6/1978 | Clark | 331/94.5 G |
| 4,188,592 | 2/1980 | Buczek et al. | 331/94.5 G |
| 4,264,878 | 4/1981 | Merritt | 331/94.5 G |
| 4,318,057 | 3/1982 | Buchwald et al. | 372/102 |
| 4,327,338 | 4/1982 | Roberts | 372/89 |
| 4,360,923 | 11/1982 | Thayer, III et al. | 372/89 |

OTHER PUBLICATIONS

Marcus et al; "R-Branch Oscillation in the 1–0 Band of an HF Laser"; *Bull. Amer. Phys. Soc.*, vol. 16, Apr. 71, p. 592.

Marcus et al; "Performance of a Transversely Excited Pulsed HF Laser"; *IEEE Jour. Quant. Elect.*, Oct. 1971.

Deutsch; "Molecular Laser Action in Hydrogen and Deturium Halides"; *Appl. Phys. Lett.*, vol. 10, No. 8, 15 Apr. '67, p. 234.

Goldhar et al; "Observations of Intense Superradiant Emission in the High Gains Infrared Trans. of HF and DF Molecules; *Appl. Phys. Lett. 18 (5)*, Mar. '71.

*Primary Examiner*—Leon Scott, Jr.
*Attorney, Agent, or Firm*—Donald J. Singer; Stanton E. Collier

[57] ABSTRACT

A continuous wave HF R-branch chemical laser uses a linear array nozzle system having primary and secondary nozzles for exciting HF and a laser resonator having mirrors with reflectance to discriminate against P-branch lasing of the excited HF.

3 Claims, 6 Drawing Figures

CW HF R-BRANCH LASER

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to continuous wave (CW) chemical lasers, and, in particular, to a cw laser that outputs a wavelength in one of the atmospheric propagation windows.

In order to maximize the amount of laser energy delivered to a target located a great distance away from a ground or near ground laser source, the laser should emit laser energy having a wavelength in one of the atmospheric propagation windows to maximize transmission.

For example, if one considers the propagation window of 2 to 2.5 micrometers ($\mu$m), the closest laser sources are a HF P-branch (2.6 to 2.9 $\mu$m) or a DF overtone (1.85 $\mu$m). Both of these have poor transmission.

Past attempts to operate in the HF R-branch wavelength in a continuous mode have been unsuccessful.

The above candidates having poor propagation in the atmosphere have motivated a search for laser sources to operate in the 2 to 2.5 $\mu$m window in particular.

SUMMARY OF THE INVENTION

The instant invention sets forth a cw R-branch chemical laser that operates in the range of 2 to 2.5 $\mu$m and therefore overcomes the problems set forth hereinabove.

Fuels and oxidizers are fed into a mixing chamber of a laser having a linear array nozzle system. A first oxidizer and a first fuel are fed into a primary reaction chamber wherein a first reaction product is formed. This first reaction product acts as a second oxidizer and is injected by supersonic primary nozzles into a second reaction chamber. A second fuel is fed into the second reaction chamber by secondary nozzles in the nozzle system. The second oxidizer and the secondary nozzle fuel reacts together in a laser cavity to cause almost total inversion in the states. This nozzle system reduces the amount of HF-HF deactivation.

In the laser cavity, a set of resonator mirrors are used to discriminate against the P-branch wavelength in the excited HF gas, but allow the R-branch wavelengths to be emitted.

The reaction products are conveyed to a neutralizer after the lasing.

It is therefore one object of the present invention to provide for a cw R-branch laser.

Another object of the present invention is to provide for a cw R-branch laser that operates in one of the atmospheric propagation windows.

Another object of the present invention is to provide a cw R-branch laser that is useful in both tactical laser and high energy laser applications.

These and many other objects and advantages of the present invention will be readily apparent to one skilled in the pertinent art from the following detailed description of a preferred embodiment of the invention and the related drawings.

DETAILED DESCRIPTION OF THE PREFERRED EMBODIMENT

There has been great interest in recent years in the development of cw laser sources capable of producing radiation in the 2–5 $\mu$m region for applications involving propagation through the atmosphere. The 2–5 $\mu$m region contains three major windows through which laser light can propagate without significant attenuation. They are the 2–2.5, the 3.5–4.2, and the 4.5–5 $\mu$m regions. The 3.5–4.2 $\mu$m region can be covered by several sources, the most popular of which has been the DF laser; and a few sources, such as the HBr laser and long-wavelength DF optical-resonance-transfer laser, have shown potential in covering the 4.5–5 $\mu$m region. No sources, however, have been available to date that provide radiation in the 2–2.5 $\mu$m region in a continuous manner.

Figure 5:
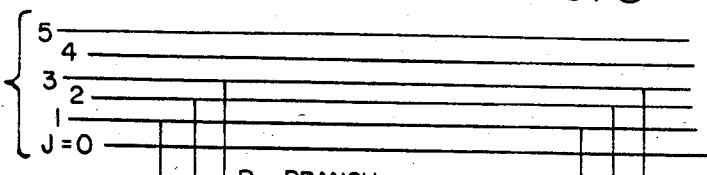
FIG. 5 shows the R- and P- branch tranmissions between various vibrational rotational states, V:J.

When HF molecules are pumped into excited vibrational-rotational levels, there are two different types of possible laser oscilliation: P-branch transitions, in which the rotational quantum number of the molecule is increased by one, and R-branch transitions, in which it is decreased by one, FIG. 5. Whereas cw HF P-branch lasers have been developed routinely at high powers in combustion-driven and other types of lasers, R-branch lasing to date has been demonstrated only in the pulsed mode because of two important factors:

1. The gain for P-branch lasing is substantially higher than that for R-branch and P-branch transitions therefore dominate the competition between the two transitions.

2. For R-branch transitions, a total inversion between the upper and lower vibrational states is necessary to achieve threshold, whereas only a partial inversion is needed for P-branch lasing.

This fact can be realized from the approximate gain equation:

$$g \approx K(1)\{N_{v'}\exp[-1.44B'J'(J'+1)/T] - N_{v''} \times \exp[-1.44B''J''(J''+1)/T]\}$$

$$g \approx K(2)\{N_{v'} - N_{84''}\exp(-2\times1.44BJ'/T)\] \text{for P branch}$$

$$g \approx K(3)\{N_{v'} - N_{v''}\exp[2\times1.44B(J'+1)/T]\}\text{for R branch}$$

where $N_{v'}$ and $N_{v''}$ represent the total population in the upper and lower vibrational levels respectively, $J''$ is the rotational quantum number of the lower state, $T$ is the gas temperature, $g$ is the small-signal gain, and $K(1)$, $K(2)$, and $K(3)$ are constants. The rotational constant $B$ for HF Molecules is 20.56 cm$^{-1}$ for the $v=0$ level and 19.8 cm$^{-1}$ for the $v=1$ level, and typical rotational numbers for lasing transitions are J=4-8. It can therefore be shown that, for a P-branch transition, an $N_{v'}/N_{v''}$ ratio of only 0.3-0.5 is necessary to achieve threshold, whereas a ratio of greater than 1 is needed to achieve gain for R-branch transitions. This requirement is difficult to achieve because of rapid HF-HF deactivation collisions, which populate the ground state during gas mixing.

Figure 1:
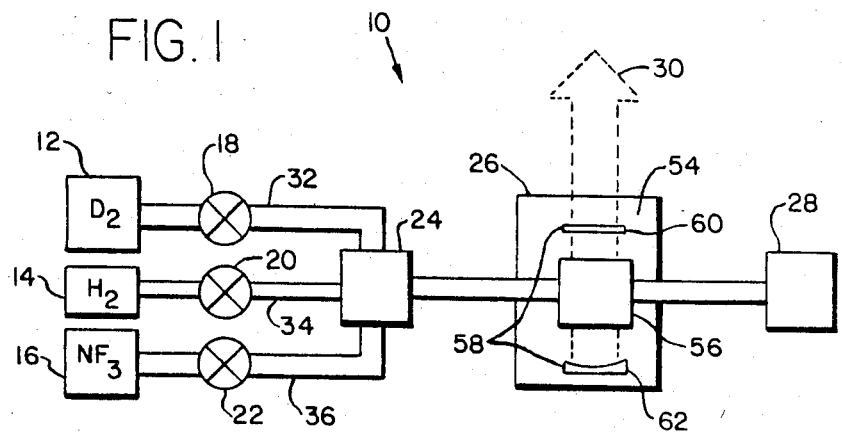
FIG. 1 is a simplified schematic of a cw HF R-branch laser of the present invention.

Referring to FIG. 1, a cw HF R-branch chemical laser 10 is shown. A mixing chamber 24 is fed by a first fuel such as deuterium ($D_2$) from a first gas source 12, a second fuel such as hydrogen ($H_2$) from a second gas source 14, and a first oxidizer such as nitrogen triflouride ($NF_3$) from a third gas source 16. Control valves 18, 20, and 22 are adjustable flow control devices. Channels 32, 34, and 36 confine the flow of fuels and oxidizers between sources 12, 14, and 16 and mixing chamber 24.

Figure 2:
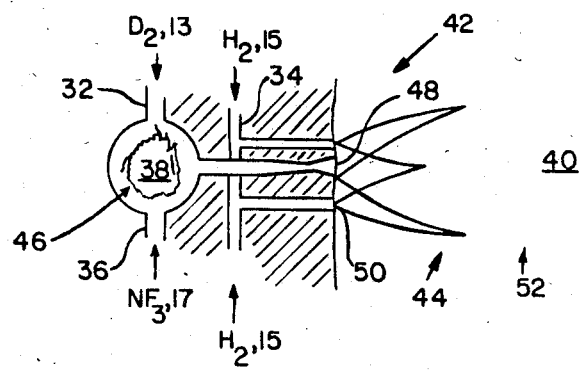
FIG. 2 is a simplified schematic of the nozzle feed system of the present invention.

Inside mixing chamber 24, shown in partial cross section in FIG. 2, a nozzle system 42 mixes and conditions a HF lasing gas 44 in a second reaction chamber 40. In particular, first fuel deuterum 13 and first oxidizer nitrogen triflouride 17 enter into a first reaction chamber 38 wherein a first reaction product 46 being a combination of nitrogen, deuterium flouride, and flourine is formed.

First reaction chamber 38 feeds a plurality of supersonic primary nozzles 48, only one shown in FIG. 2.

Figure 3:
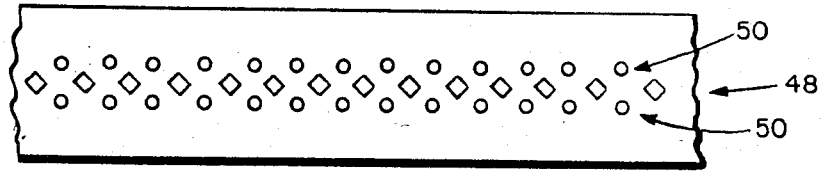
FIG. 3 is a front view of the nozzle system of the present invention.

Second fuel hydrogen 15 is fed into a plurality of sCupersonic secondary nozzles 50. The arrangement of primary nozzles 48 and secondary nozzles 50 is shown in FIG. 3. The particular linear array is flat, but other arrangements are possible if they provide efficient mixing.

Primary nozzles 48 are in a linear row and are equally spaced apart. Secondary nozzles 50 are in two linear rows. One above and one below primary nozzles 48. Each secondary nozzle 50 is equally spaced apart, the spacing being essentially equal to the spacing of primary nozzles 48. Secondary nozzles 50 form a square pattern about each primary nozzle 48.

Second fuel hydrogen 15 reacts with first reaction product 46 in second reaction chamber 40 to form an excited HF gas 52. The above arrangement of nozzles 48 and 50, shown in FIG. 3, minimizes the opportunity for HF - HF deactivation and maximizes the possibilty for total inversion between the upper and lower states, FIG. 5.

Figure 4:
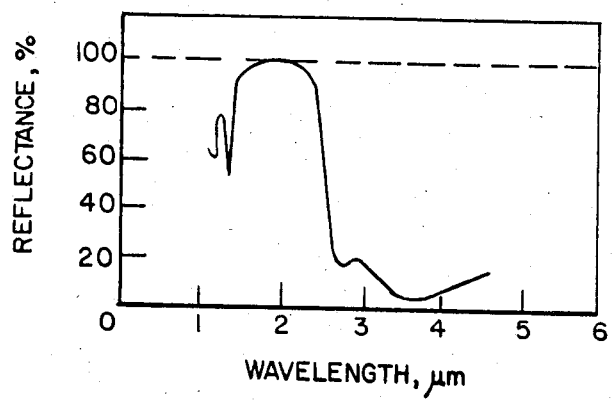
FIG. 4 is a graph of the reflectance that is used on the resonator mirrors in the present invention.

Referring again to FIG. 1, excited HF gas 52 flows thereafter into extraction chamber 26 having a laser resonator 54 that has an optical cavity 56 and a pair of resonator mirrors 58. A gas neutralizer 28 receives all of the combustion products. In order to discriminate against P-branch wavelengths, resonator mirrors 58 are coated so as to have a reflectance as shown in FIG. 4. A close examination of the curve in FIG. 4 shows that the reflectance is approximately 95% at 2.5 $\mu$m and drops rapidly to 75% at 2.6 $\mu$m. An output mirror 68 is flat and a curved mirror 62 has a 3 meter wave-front curvature.

Figure 6:
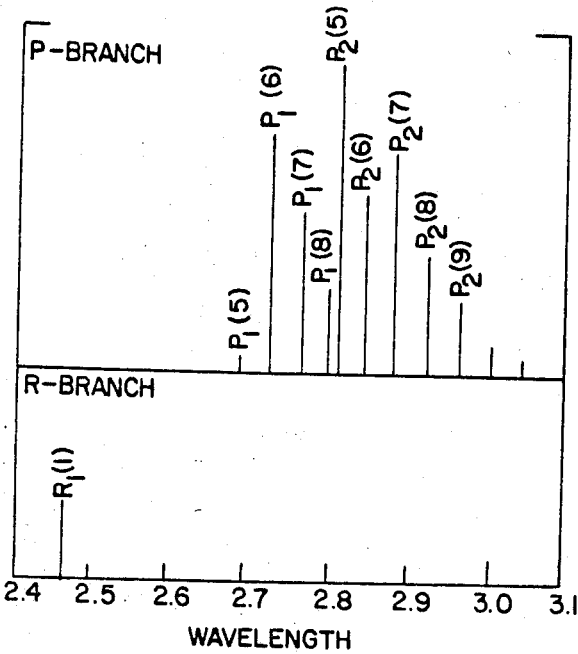
FIG. 6 shows the HF R-branch lasing spectra of the present invention.

A 2.5 W laser beam 30 was outcoupled at 2.47 $\mu$m on the R-branch (V=1→0, J=2→1) transition from a nominally 50-W HF P-branch laser. FIG. 6 contrasts the normal HF spectrum with the R-branch lines observed. It is believed that the present efficiency can be improved significantly by the use of a more suitable set of mirrors and further optimization.

Clearly, many modifications and variations of the present invention are possible in light of the above teachings and it is therefore understood, that within the inventive scope of the inventive concept, the invention may be practiced otherwise than specifically claimed.

What is claimed is:

1. A chemical laser for continuous wave (CW) HF R-branch line operation, said laser outputting a CW laser beam having a wavelength of about 2 to 2.5 micrometers for use in an atmosphere progation window, said laser comprising:

means for providing fuels and oxidizers, a first fuel being deuterium, a second fuel being hydrogen and an oxidizer being nitrogen trifluoride;

means for controlling the flow of said fuels and said oxidizer from said means for providing;

a mixing chamber, said mixing chamber including a linear array nozzle system, a plurality of first reaction chambers, and a second reaction chamber, said fuel deuterium and said oxidizer nitrogen trifluoride are input by said controlling means into each of said first reaction chambers wherein a first set of reaction products are formed, said first set of reaction products being output by a plurality of primary nozzles into said secondary reaction chamber, said fuel hydrogen being input by said controlling means and being output by a plurality of secondary nozzles to said secondary reaction chamber, said hydrogen and said first set of reaction products reacting in said secondary chamber to form a second set of reaction products having therein excited HF almost totally inverted between upper and lower states to achieve a laser gain threshold;

an extraction chamber, said extraction chamber including a laser resonator, said extraction chamber receiving said second set of reaction products and outputting a continuous R-branch line laser beam, said resonator having a pair of discriminating resonator mirrors therein, said resonator mirrors having a reflectance centered on R-branch line wavelengths, said reflectance being appropriately 95% at 2.5 micrometers and rapidly decreasing to 75% at 2.6 micrometers, said resonator outputting a continuous wave R-branch line ($v=1\rightarrow0$, J=2→1) laser beam at 2.47 micrometers; and a reaction product neutralizes said neutralizer receiving said products from said extraction chamber.

2. A chemical laser as defined in claim 11 wherein said lineary array nozzle system includes said primary and said secondary nozzles, said primary nozzles being positioned in a line and equally spaced apart, said secondary nozzles being positioned in two lines and equally spaced apart, said line of said primary nozzles being positioned between said two lines of said secondary nozzles, said secondary nozzles forming a square pattern about each of said primary nozzles.

3. A method of producing a continuous wave HF R-branch chemical laser beam comprising the steps of:

mixing deuterium and nitrogen trifluoride in a primary reaction chamber to form a first set of reaction products;

injecting supersonically said first set of reaction products into a secondary reaction chamber;

injecting supersonically hydrogen into said secondary reaction chamber, said hydrogen reacting with said first set of reaction products to form a second set of reaction products, said second set of reaction products having excited HF molecules therein such that upper states substantially predominate over lower states of said excited HF molecules to achieve a laser gain threshold, a linear array nozzle system injecting said first set of reaction products and said hydrogen into said secondary reaction chamber;

inputting said excited HF molecules into a laser beam extraction chamber, said laser beam extraction chamber including a laser resonator where said excited HF molecules change states such that lasing occurs discrimiating against P-branch wavelengths in said extraction chamber with a set of resonator mirrors about said resonator having a reflectance centered on R-branch wavelengths, said reflectance being approximately 95% at 2.5 micrometers and rapidly decreasing to 75% at 2.6 micrometers; and outputting a continuous wave R-branch line ($\nu = 1 \rightarrow 0$, $J = 2 \rightarrow 1$) laser beam at 2.47 micrometers from said extraction chamber.

* * * * *